UNITED STATES PATENT OFFICE.

NATHAN SULZBERGER, OF NEW YORK, N. Y.

PROCESS OF MAKING AZO DYES CONTAINING FATTY ACID RADICALS.

No. 902,021.   Specification of Letters Patent.   Patented Oct. 27, 1908.

Application filed October 2, 1907. Serial No. 395,507.

*To all whom it may concern:*

Be it known that I, NATHAN SULZBERGER, a citizen of the United States, residing at No. 34 West Seventy-first street, New York city, New York, United States of America, have invented new and useful Improvements in Processes for the Production of Azo Dyestuffs Containing the Radicals of Higher Fatty Acids, of which the following is a specification.

In the application, Serial No. 364,737, filed by me March 26th 1907, a process for the production of azo dyes containing the radical of a higher fatty acid is described. The therein described process consists in the combination of diazo compounds containing the radical of a higher fatty acid with amins or phenols and derivatives of same. It has now been found that azo dyes containing the radical of a fatty acid can also be obtained by combining a diazo salt with an amin or a derivative of such an amin (as amido-phenol, a diamin) which amin, etc. contains the radical of a fatty acid, and not only as described in Serial No. 364,737, by combining a diazotized compound which contains the radical of the fatty acid with an amin or phenol—or their derivatives—which do not contain such fatty acid radicals. The amins which are to be considered in the present case may contain besides the amid group in which the radical of the fatty acid is located, one or more other amino or phenol groups or phenol and amid groups at the same time. The azo dyes obtained in the present application are entirely similar in character to those described in application, Serial No. 364,737.

In a number of cases the present process, however, offers advantages over and above the old process; as the raw materials here required are very often cheaper and more easily to be had and as the formation of certain dyes is often quicker and the yields better than in the former process. The fatty acids which are used in manufacturing these azo colors are those contained in natural vegetable and animal fats and oils, principally stearic, palmitic and oleic acids and their mixtures. The acid radical of one of these acids is introduced into the aromatic amin or derivative of same—amido-phenol, p-phenylendiamin, benzidini- or naphthylamin—substituting an atom of hydrogen in the amido group. It is, however, not necessary that the amin at the time when the radical of the fatty acid is introduced, contains any other amido or phenol group. Such additional amido or phenol group or groups of both may be introduced, later on after the fatty acid has been introduced, i. e. by nitrating the amin after it already contains the fatty acid radical, reducing the ensuing nitro compound and in case an oxy group is desired in substituting the amin group by an oxy group. In certain cases, of course, it will be more convenient to start right away with a diamin or any other derivative of an amin (naphthylamin) and to introduce into such amin the desired fatty acid radical, whereby immediately the desired oxy or amino (or any other substitution product) of the fatty acid arylid is obtained, which is then connected with the diazo compound. In regard to the diazo compounds which are to be used in the present here described process and to be brought into reaction with the amino or oxy fatty acid arylids, any diazo salt can be used.

*Examples.*

(1) 50 gr. stearic acid are heated with a reflux condenser with somewhat more than one molecule of anilin to about 250° for about 4 to 5 hours. After removing the reflux condenser the temperature is raised to about 280° and the superfluous anilin which has not reacted with the acid is distilled off. The thus obtained stearic acid anilid is dissolved in 600 to 700 gr. conc. $H_2SO_4$ preferably at a temperature where the anilid is just in a molten state. Care should be taken in mixing the anilid with the acid. Into this solution is slowly added at ordinary temperature (if necessary cool) a little more than one molecule of nitric acid. After adding the nitric acid the mixture is slowly poured into cold water which is being continually stirred, whereby the nitrated anilid of the stearic acid separates out as a yellow mass. It is now freed as much as possible from the water, dissolved in alcohol and the nitro group reduced by means of metals and acid (with iron and hydrochloric acid). The thus obtained amido stearic acid anilid is brought in reaction with any diazo salt. If diazobenzolchlorid is used a yellow dye of a fatty character is formed.

(2) The same azo dye is obtained when stearic acid is heated together with p-phenylendiamin and the hereby formed p-amino anilid of the stearic acid is brought into reaction with diazobenzolchlorid; 4 gr. stearic acid are melted together with 2 gr. of p-phenylendiamin (theory 1.5 gr.) for from 15 to 20 minutes at a temperature of about 200°. The compound thus obtained crystallized from alcohol, finely suspended in warm water and brought in reaction with diazobenzolchlorid gives the same fatty azo dye as described in No. 1.

(3) In similar manner an amin containing an oxy group (such as, i. e. p-aminophenol heated together with one molecule of a fatty acid (i. e. palmitic acid) gives us the oxyarylid of a fatty acid which can be connected with a diazo salt whereby an azo dye ensues of a fatty character.

(4) Diamins and benzidin can also be used in the manufacture of these fatty azo dyes as they, when connected with a fatty acid and reacting with a diazo salt, form also azo dyes of a fatty kind.

(5) Naphthylamin can also be employed as follows:—5 gr. palmitic acid are heated together with somewhat more than one molecule of naphthylamin (theory 2.8 gr.) at a temperature of about 250° water is visibly split off. The temperature is finally raised to 300° whereby most of the superfluous naphthylamin sublimes away. The resulting compound recrystallized from alcohol is obtained in colorless crystals which is dissolved in about 100 gr. conc. sulfuric acid and nitrated with one molecule of nitric acid taking 3.8 cc. (specific gravity 1.17) at a temperature of 0.-5°. The liquid is now poured into cold water and the yellow crystalline compound which is precipitated, is filtered off and washed free from the acids. After dissolving in alcohol it is reduced with zinc and hydrochloric acid to the colorless amin body which separates out from the liquid after the zinc mud has been filtered off, on the addition of water. This amido body finely suspended in water which has been acidulated with acetic acid is added to a solution of diazobenzolchlorid whereby a reddish brown azo dye is produced of a fatty character.

(6) 5 gr. palmitic acid are melted together with 2.2 gr. p-aminophenol, at about 200° water is visibly split off. The temperature is gradually raised to about 250° constantly stirring and heated as long as steam bubbles are discharged. On cooling the reddish brown liquid solidifies to a gray mass which is recrystallized from alcohol. Finely divided in water the oxyanilid after the addition of an alkali is brought into reaction with diazobenzolchlorid. An azo dye of reddish brown shade was obtained of a fatty character as the other dyes herein described.

The qualities and uses of the herein described fatty azo dyes are entirely similar to those described in the application Serial No. 364,737.

The shades of the described azo dyes are less dependent on the fatty acid used, than upon the diazo salt which was employed in their manufacture.

If more than one molecule of nitric acid be used in nitrating and also the temperature during the nitration is higher than described in the given examples, the shades of the ensuing dyes are generally deeper.

What I claim and desire to secure by Letters Patent of the United States is:

1. A process for the production of azo dye stuffs containing the radicals of fatty acids occurring in fats and oils, consisting in coupling diazo compounds with oxy-and-amino-derivatives of arylids containing the radical of such fatty acids as occur in animal and vegetable fats and oils, substantially as described, and for the purpose set forth.

2. A process for the production of azo dye stuffs containing the radicals of fatty acids occurring in fats and oils, consisting in coupling diazo compounds with oxy-and amino derivatives of arylids containing the radicals of mixtures of fatty acids occurring in animal and vegetable fats and oils, substantially as described and for the purpose set forth.

In witness whereof I have hereunto signed my name this 19th day of September 1907, in the presence of two subscribing witnesses.

NATHAN SULZBERGER.

Witnesses:
 HENRY HASPER,
 WOLDEMAR HAUPT